United States Patent
Zhang

(10) Patent No.: US 9,257,144 B1
(45) Date of Patent: Feb. 9, 2016

(54) SHINGLED MAGNETIC RECORD HARD DISK DRIVE AND METHOD FOR CREATING A LOGICAL DISK FROM PHYSICAL TRACKS

(71) Applicant: PMC-SIERRA US, INC., Sunnyvale, CA (US)

(72) Inventor: Dong Zhang, Beijing (CN)

(73) Assignee: PMC-Sierra US, Inc., Sunnyvale, CA (US)

( * ) Notice: Subject to any disclaimer, the term of this patent is extended or adjusted under 35 U.S.C. 154(b) by 0 days.

(21) Appl. No.: 14/688,696

(22) Filed: Apr. 16, 2015

(51) Int. Cl.
  *G11B 5/596* (2006.01)
  *G11B 20/12* (2006.01)

(52) U.S. Cl.
  CPC .... *G11B 20/1217* (2013.01); *G11B 2020/1238* (2013.01)

(58) Field of Classification Search
  CPC ........... G11B 5/59655; G11B 5/59688; G11B 5/59633; G11B 19/16; G11B 27/34; G11B 5/5547; G11B 5/59627; G11B 5/012; G11B 15/06; G11B 5/00
  USPC ............... 360/79, 78.14, 78.07, 77.06, 77.07, 360/77.08, 74.05, 55, 31, 72.1, 72.3
  See application file for complete search history.

(56) References Cited

U.S. PATENT DOCUMENTS

| | | | |
|---|---|---|---|
| 8,786,969 B2 * | 7/2014 | Kasiraj et al. | G11B 5/746 360/39 |
| 2011/0075292 A1 | 3/2011 | New et al. | |

FOREIGN PATENT DOCUMENTS

EP      1521261      4/2005

\* cited by examiner

*Primary Examiner* — Nabil Hindi
(74) *Attorney, Agent, or Firm* — Dennis R. Haszko

(57) ABSTRACT

A system for writing data to overlapping physical tracks of a shingled magnetic record (SMR) hard disk drive (HDD) and a method for creating a logical disk from overlapping physical tracks of the SMR HDD. The system comprises a write header and a memory identifying the overlapping physical tracks which are accessible through the logical disk. The physical tracks are spaced from each other by at least the width of the write header. The method comprises mapping in a memory the logical disk to writeable tracks of the overlapping physical tracks, the writeable tracks spaced from each other by at least the width of the write header.

20 Claims, 7 Drawing Sheets

US 9,257,144 B1

SHINGLED MAGNETIC RECORD HARD DISK DRIVE AND METHOD FOR CREATING A LOGICAL DISK FROM PHYSICAL TRACKS

FIELD

The present disclosure relates to electronic storage devices. More particularly, the present disclosure relates to shingled magnetic record (SMR) hard disk drives (HDDs).

BACKGROUND

Hard disk drives are data storage devices for storing digital information or data which can be retrieved at a later time. A hard disk drive is a type of non-volatile memory that retains stored data irrespective of whether the drive has power. A hard disk drive comprises platters or disks coated with a magnetic material for storing charges. Data is stored by placing a charge on the magnetic material. The hard disk drive also comprises one or more read and write headers. The headers are configured to store charges to, and read charges from, the magnetic material of the platter. The headers are arranged on a moving actuator arm which positions the headers over the platters at the correct location to write data to, or read data from, the platters as the platters rotate at high speeds. The use of platters and headers permits data to be read from or written to a hard disk drive in a random-access manner. Randomly accessing data refers to reading or writing a first set of data at a first location on the platter and then a second set of data at a second location on the platter without having to read or write data through all intervening locations between the first and second locations.

Platters are divided into multiple co-centric circular tracks, the circular tracks radiating from the centre to the edge of the platter. The tracks have a width. The tracks help identify or reference the physical location where data may be, or is, stored on the platter. The width of the tracks may correspond to the width of the read or write header. Adjacent tracks may be grouped into bands in the case of SMR HDDs.

FIG. 1 shows a top view of a portion of a platter 100 of a SMR HDD as known in the art. The platter 100 comprises tracks 102a-c, and bands 104 and 110. Tracks 102a-c overlap with each other in a "shingled" fashion. Tracks of a band 104 do not overlap, however, with tracks of another band. Overlapping tracks 102a-c permits more tracks to be stored on a platter of a given size thus increasing the data density of the platter and the hard disk drive. The amount of overlap between adjacent tracks 102a-c is determined by the size of a read header 106 and a write header 108 for the platter 100. Specifically, the area of a track 102a-c that is not masked by an adjacent track 102a-c must be at least as large as the width of the read header 106. This permits the read header 106 to only sense charges stored on one of the tracks 102a-c during a read operation. The width of the read header 106 can be made smaller than the width of a write header 108. Accordingly, the amount of overlap between adjacent tracks 102a-c is the difference between the width of the write header 108 and the width of the read header 106. The width of the write header 108 is larger than the unmasked area of a target track 102a. Accordingly, when writing data to the target track 102a, the write header 108 also incidentally stores the same data on an adjacent track 102b overlapping with the target track 102a. This causes complications when data is randomly being written to the tracks. Since the adjacent track 102b is on a higher layer than the target track 102a, writing data to the target track 102a overwrites data on the adjacent track 102b.

To preserve the existing data on the adjacent track 102b in a SMR HDD, the existing data is read from the adjacent track 102b, temporarily stored, and only written back to the adjacent track 102b once the new data has been written to the target track 102a. But writing existing data back to the adjacent track 102b also incidentally stores that data on a second adjacent track 102c that is overlapping with the adjacent track 102b. Accordingly, when writing data to the target track 102a, all data on upper layer tracks 102b,102c must first be read and temporarily stored, then written back starting with the lowest layer track 102b and proceeding in order to the highest layer track. Failure to do so will result in loss of information.

If not for the difference in read header 106 and write header 108 widths, there would be no need to overlap tracks. Overlapping tracks improves the data density of a HDD by taking advantage of the smaller width of the read header as compared to the write header width. The trade-off for improved data density, however, is a potential decrease in write performance. The write performance (e.g. the amount of time required to write new data to a track) for an SMR HDD will typically be lower than the write performance for a non SMR HDD when data is written randomly to a band. Randomly writing data to an SMR HDD results in write amplification: for each track to which new data is written, multiple upper-layer tracks in the band, if any, must also be read from and written to.

Optimization methods have been developed to improve the write performance when randomly writing data to an SMR HDD. In one optimization method, random data is packaged into sequential data so that when sufficient data has been accumulated, it is all written sequentially to a band rather randomly at different times. This method randomly allocates tracks for all data (including data which is inherently sequential), however, which reduces the read performance for sequential data.

Improvements in write performance for the writing of random write data to an SMR HDD are desirable.

DETAILED DESCRIPTION

Figure 1:
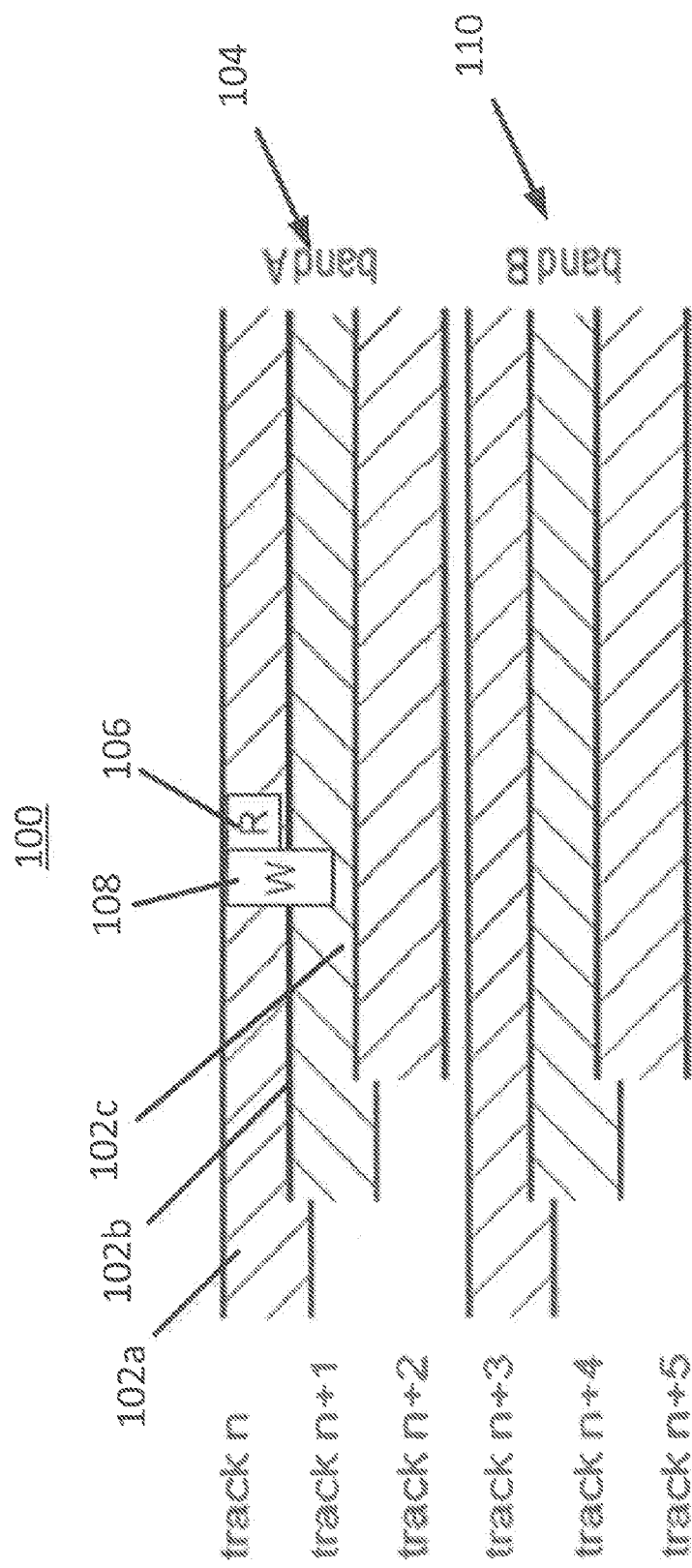
FIG. 1 shows a top view of a portion of a SMR HDD platter.

This disclosure describes a system and method for writing random write data to a SMR HDD with improved write performance. In an embodiment, data is only written to physical tracks of the SMR HDD which are spaced from each other by a distance greater than the write header width, and which are not adjacent to one another. For example, data may only be written to every other physical track. A physical track can only be accessed by external devices if it is identified in a logical disk. Physical tracks which are mapped to a logical disk are referred to as writeable tracks. The physical tracks between the writeable tracks are not mapped to a logical disk. Those tracks are referred to as unwriteable tracks because they cannot be accessed by external devices. Because of the width of the write header, data is incidentally stored on the unwriteable tracks when writing data to the writeable tracks. Unwriteable tracks and the data stored thereon, however, are ignored because they are not mapped to a logical disk.

In the present disclosure, storing data on a track is different than writing data to a track. Writing data to a track means that data is intentionally placed on the track. By contrast, storing data on a track means that data is incidentally placed on the track because of the proximity of that track to another track to which data is being written. Writing data only to tracks which are spaced from each other by at least the width of the write header avoids overwriting important data on adjacent tracks. The spacing between tracks is measured from the same reference point of each track. For example, the distance between two tracks may be measured from the centre of one track to the centre of another track. This, in turn, avoids write amplification thus improving the SMR HDD write performance. In an embodiment, when all of the writeable tracks contain data, the unwriteable tracks may then be converted to writeable tracks and used in accordance with existing methods. Improving the write performance of SMR HDDs, for at least a portion of time, permits the SMR HDDs to be used for new data storage applications which would not have otherwise been available.

Typical SMR HDDs that are not in accordance with the present disclosure are used in such applications as video on demand (VOD), data backup, and internet disks because these applications typically comprise sequential, and not random access, read or write operations. SMR HDDs in accordance with the present disclosure, however, may also be suitable for random write applications, such as online transaction processing (OLTP) databases, for at least for a portion of the period of use of the SMR HDDs.

In accordance with an embodiment of the present disclosure, a data storage system comprises a shingled magnetic recording (SMR) hard drive (HDD) comprising a plurality of SMR tracks, each of the plurality of SMR tracks overlapping with an adjacent track of the plurality of SMR tracks; a write header configured to store data to the plurality of SMR tracks, the write header having a write header width; a memory storing a logical map mapping writeable tracks of the plurality of SMR tracks to one or more logical disks, the writeable tracks being spaced from each other by a distance greater than the write header width; and a controller in communication with the write header and the memory, the controller configured to write data, using the write header, to only the writeable tracks of the plurality of SMR tracks. Each of the writeable tracks of the data storage system may be separated from the other writeable tracks by at least an unwriteable track of the plurality of SMR tracks, the unwriteable track having no mapping in the memory to any logical disk. The controller may be configured to map the unwriteable tracks in the memory to a logical disk in response to insufficient free space being available on the writeable tracks to store data. The controller may be configured to map the unwriteable track in the memory to a logical disk in response to the writeable tracks adjacent the unwriteable track receiving sequential write data. The controller may be a redundant array of independent disks (RAID) controller. The controller may be a host. The SMR HDD further may further comprise a second plurality of SMR tracks, each of the second plurality of SMR tracks overlapping with another of the second plurality of SMR tracks; and the logical map may map writeable tracks of the second plurality of SMR tracks to the one or more logical disks, the writeable tracks comprising all of the tracks of the second plurality of SMR tracks. One of the one or more logical disks may comprise logical tracks, and the logical map comprises logical tracks mapped to the writeable tracks.

In accordance with an embodiment of the present disclosure, the method for creating a logical disk from physical tracks in a shingled magnetic recording (SMR) hard drive (HDD), the SMR HDD comprising a write header having a write header width, comprises identifying a plurality of SMR HDD tracks, each of the plurality of the SMR HDD tracks overlapping with an adjacent track of the plurality of SMR HDD tracks; and creating a logical disk in a memory by mapping writeable tracks among the plurality of SMR HDD tracks to the logical disk, the writeable tracks being spaced from each other by a distance greater than the write header width. The method may further comprise monitoring input/output (IO) requests to the plurality of SMR HDD tracks; determining the number of IO requests comprising sequential write data; and in response to the number of IO requests comprising sequential write data being greater than a threshold number, mapping unwriteable tracks from the plurality of SMR HDD tracks to the logical disk, the unwriteable tracks becoming writeable tracks upon being mapped. The method may further comprise remapping a plurality of physical tracks in a shingled magnetic recording (SMR) hard drive (HDD) comprising a write header with a write header width by monitoring input/output (IO) requests to the plurality of physical tracks; determining the number of IO requests comprising random write data or sequential write data; in response to the number of IO requests comprising random write data or sequential write data being greater than a threshold number, remapping the plurality of physical tracks in a memory. The physical tracks allocated for receiving random write data may be remapped for receiving sequential write data in response to the number of IO requests comprising sequential write data being greater than the threshold number. The physical tracks allocated for receiving sequential write data may be reallocated for receiving random write data in response to the number of IO requests comprising random write data being greater than the threshold number. Remapping the plurality of physical tracks for receiving random write data may comprise identifying writeable tracks and unwriteable tracks from the plurality of physical tracks, the writeable tracks being spaced from each other by a distance greater than the write header width, the unwriteable tracks being the plurality of physical tracks other than the writeable tracks; transferring data stored on the unwriteable tracks to other physical tracks of the SMR HDD; and restricting access to the unwriteable tracks. Reallocating the plurality of physical tracks for receiving sequential write data may comprise permitting access to the plurality of physical tracks.

In accordance with an embodiment of the present disclosure, the data storage system may comprise a hard drive (HDD) comprising a plurality of physical tracks, each of the plurality of physical tracks adjacent to another of the plurality of physical tracks; a read header having a read header width; a write header having a write header width greater than the read header width; a memory storing information identifying, for external devices, writeable tracks of the plurality of physical tracks, the writeable tracks spaced from each other by a distance greater than the write header width; and a controller in communication with the read header, the write header, and the memory, the controller configured to permit access to only the writeable tracks identified in the memory of the plurality of physical tracks. The HDD may be a shingled magnetic recording (SMR) HDD. Each of the writeable tracks may be separated from the other writeable tracks by at least an unwriteable track of the plurality of physical tracks of the HDD, the memory having no information identifying, for external devices, the unwriteable tracks of the plurality of physical tracks. The information may identify a logical disk, the logical disk identifying the writeable tracks of the plurality of physical tracks. The controller may comprise a request processor.

Figure 2:
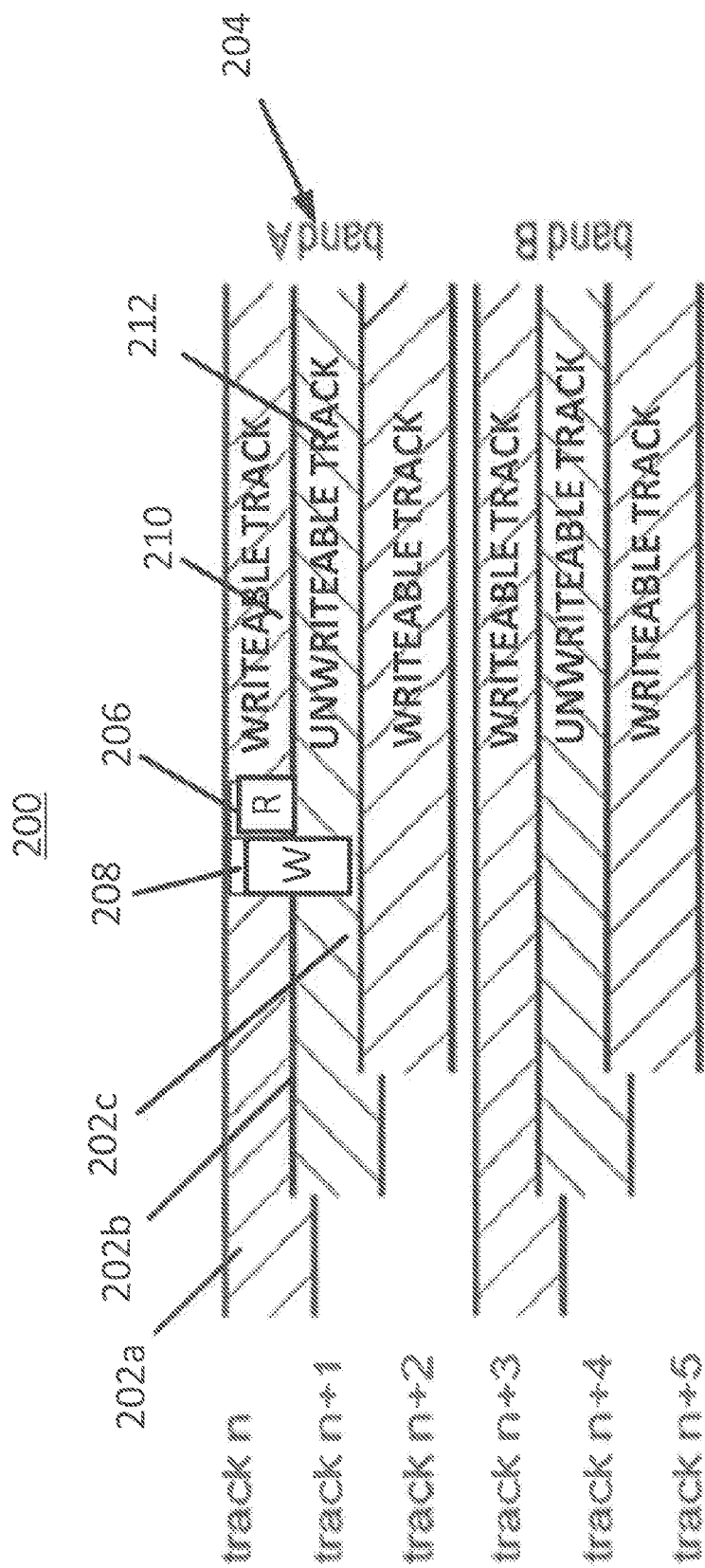
FIG. 2 shows a top view of a portion of a platter of a SMR HDD in accordance with an embodiment of the present disclosure.

FIG. 2 shows a top view of a portion of a SMR HDD platter 200 comprising a band 204 of tracks 202a-c in accordance with the present disclosure. Tracks 202a and 202c are writeable tracks. Track 202b is an unwriteable track or garbage track. The unwriteable track 202b is interleaved between, and overlaps with and is overlapped by, the two writeable tracks 202a, 202c, respectively. The write header 208 width is smaller than the combined width of the writeable track 202a and unwriteable track 202b. Interleaving the unwriteable track 202b between the writeable tracks 202a, 202c, accordingly, permits data to be written to the lower layer writeable track 202a without being concerned about the data also being simultaneously stored on the upper layer unwriteable track 202b. Although data is still stored to the unwriteable track 202b due to the width of the write header 208, that track has no corresponding logical disk and is ignored. Accordingly, data will not be written to or read from the unwriteable track 202b by external devices. This avoids write amplification by not having to read from, temporarily store, then re-write existing data to the upper layer track 202b each time data is written to the lower layer track 202a in the band 204.

Depending upon the difference in width between a read header and write header, two writeable tracks may need to be spaced from each other by a plurality of unwriteable tracks. The number of plurality of unwriteable tracks must be sufficient to permit the write header to write data to a lower layer writeable track without simultaneously and incidentally storing the same data on a next closest upper layer writeable track.

Figure 3A:
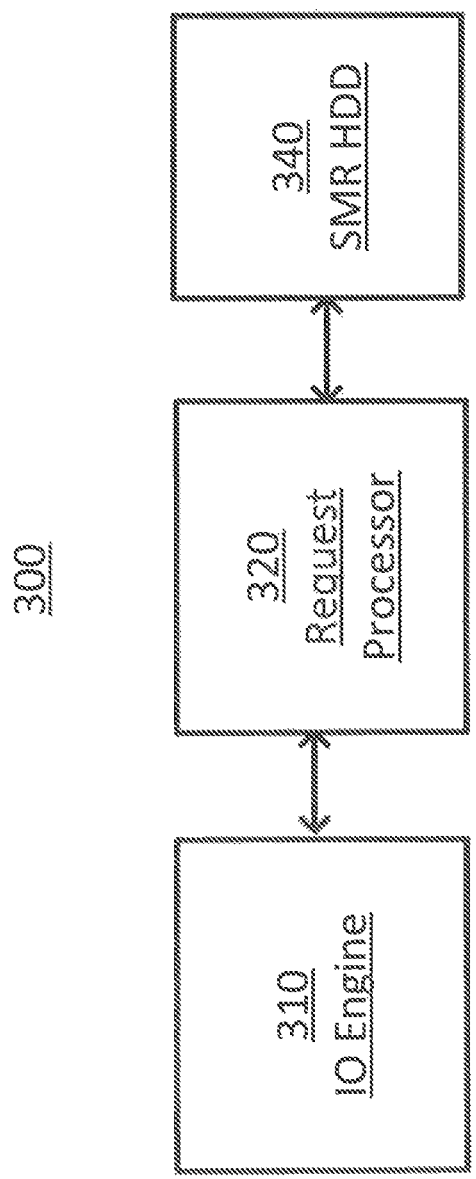
FIG. 3A shows a data storage system in accordance with an embodiment of the present disclosure.
Figure 3B:
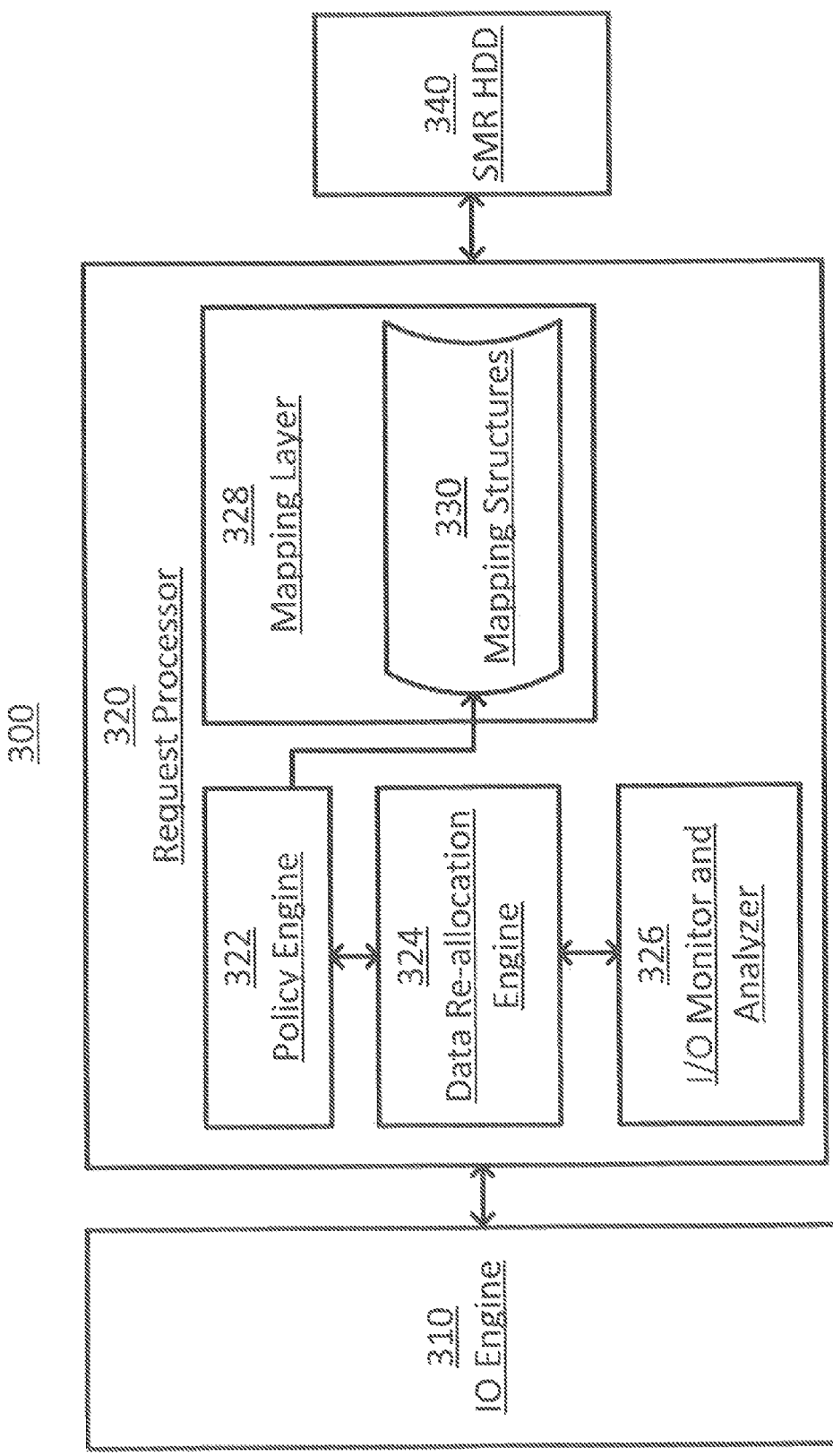
FIG. 3B shows the data storage system shown in FIG. 3A in further detail.

FIG. 3A shows a data storage system 300 in accordance with an embodiment of the present disclosure. FIG. 3B shows data storage system 300 shown in FIG. 3A in greater detail. The system 300 comprises an IO Engine 310, a request processor 320, and a SMR HDD 340.

The IO Engine 310 is a module in an upper layer which can reside in hardware or software on a host or another device. The IO Engine 310 generates input/output requests to the SMR HDD 340. Typically, unlike in accordance with the present disclosure, an IO Engine would communicate directly with the SMR HDD.

The request processor 320 (which may also be referred to as a virtualization layer) presents a virtualization of the SMR HDD 340 to upper layers such as the IO Engine 310. The request processor 320 intercepts input/output requests between the SMR HDD 340 and the IO Engine 310. The request processor 320 may be implemented in software, hardware, or a combination of software and hardware in a controller on the SMR HDD 340, or in a controller connected with one or more HDDs such as a redundant array of independent disks (RAID) controller. The request processor 320 may also reside in a controller on the host such as the volume management layer (in a Linux Logical Volume Manager (LVM)) inside a host operating system kernel.

External devices access the data storage system 300 to write data to, and read data from, the HDD 340. In accordance with the present disclosure, however, external devices can only access those portions of an HDD 340 which are identified in a logical disk as presented by the request processor 320. Typically, a logical disk only identifies logical block addresses (LBAs). The logical disk's LBAs correspond or are mapped to physical LBAs on the SMR HDD 340 which, in turn, correspond with physical tracks on the SMR HDD. In an embodiment of the present disclosure, the request processor 320 creates and presents logical disks comprising LBAs associated with only certain physical LBAs and, accordingly, certain physical tracks of the HDD 340. The LBAs of these logical disk are for use by external devices. In this way, the request processor 320 controls which physical tracks of the SMR HDD 340 which are accessible by external devices.

A logical map mapping LBAs of logical disks to physical LBAs of the SMR HDD may be stored in a memory. The logical map may, itself, represent the logical disks. Alternatively, the logical map may simply reference the logical disks and the physical LBAs of the SMR HDD such that the actual logical disks are separate therefrom.

In an embodiment of the present disclosure, the request processor 320 creates logical disks identifying LBAs which only correspond, map to, or reference physical tracks in the HDD 340, the physical tracks spaced from each other by a distance greater than the width of the write header. Physical tracks of the SMR HDD 340 which correspond, directly or indirectly, to the LBAs of a logical disk may be referred to as writeable tracks because they can be intentionally written to or read from as a result of a request from an external device. Physical tracks of the HDD 340 which are not identified in, or mapped to, any LBA of a logical disk may be referred to as unwriteable tracks. By creating logical disks which only correspond with writeable tracks of the HDD 340, the request processor 320 essentially controls, directly or indirectly, which physical tracks of the SMR HDD 340 are written to and read from using the write and read headers, respectively. In other words, the request processor 320 permits access to only the writeable tracks.

In an embodiment of the present disclosure, the request processor 320 may comprise a mapping layer 328 which maps the LBAs of a logical disk to LBAs of a SMR HDD 340. The mapping layer 328 may store the mappings in a memory in a certain format as mapping structures 330.

In an embodiment of the present disclosure, the logical disks created and presented by the request processor 320 may identify LBAs which are different than the LBAs used by the HDD 340 to reference physical tracks. The request processor 320 (with, in some cases, the assistance of its sub-components such as a mapping layer 328) acts as an input/output proxy for the HDD 340 by intercepting I/O requests from devices to the HDD 340, mapping the LBAs in the IO request to the LBAs recognized by the HDD 304, and forwarding the mapped IO requests to the HDD 340.

The request processor 320 (with the assistance of one of its sub-components such as a policy engine 322) may create logical disks when the SMR HDD 340 is first initialized. To create a logical disk, the request processor 320 maps the LBAs of physical tracks of the HDD 340 to LBAs of the logical disks. The mappings may be represented in mapping structures 330 such as mapping tables, linked lists, arrays, and registers. The mapping structures may be stored a memory. Which LBAs of physical tracks are mapped to which LBAs of logical disc, if any, may be in accordance with a user's preferences or requirements, or determined by an automated process. The request processor 320 (or one of its sub-component such as the policy engine 322) may also remap physical tracks to logical disks at different points in time. The remapping may be in accordance with a user's preferences or requirements, or may be automatically determined according to actual usage of the HDD 340 over a period of time.

Different portions of the HDD 340 may be allocated for being written to with data in different ways to optimize write performance and data density. For example, a first portion of the HDD 340 may be allocated for being randomly written to with data (also referred to as receiving random write data), and a second portion of the HDD 340 may be allocated for being sequentially written to with data (also referred to as receiving sequential write data). In an embodiment, to allocate a portion of the SMR HDD 340 for receiving random write data, the request processor 320 identifies or maps logical disks with only physical tracks of the portion of the SMR HDD 340 which are spaced from each other by a distance of at least the width of the write header. The spacing between two tracks is measured from the same location of each of the tracks. In other words, unwriteable tracks are interleaved between writeable tracks for that portion. In another embodiment, to allocate a second portion of the SMR HDD 340 for receiving sequential write data, the request processor 320 identifies or maps in the logical disks all of the physical tracks of that second portion of the SMR HDD 340. In other words, all of the physical tracks of the second portion are writeable. A portion may be, for example, physical tracks in a band or in a platter, or in any portion thereof.

The request processor 320 configures a physical track of an SMR HDD to be a writeable track by mapping the LBA of the physical track to the LBA of the logical disk. Mapping means to identify a relationship between the LBAs of an SMR HDD and the LBAs of one or more logical disks in a memory, for example in a mapping table. The relationship may be part of, or separate from, the representation of logical disks. Unwriteable tracks are interleaved between writeable tracks by not mapping the LBA corresponding to the unwriteable physical tracks to the logical disks. Interleaving unwriteable tracks between writeable tracks gives more physical space between the writeable tracks. This permits data to be written to the writeable tracks with the write header without incidentally overwriting relevant data on other writeable tracks. Data is still incidentally stored to an unwriteable track due to the write header overlapping with the unwriteable track when writing data to an adjacent writeable track. Notwithstanding, since unwriteable tracks are not identified in a logical disk, the unwriteable track cannot be accessed by external devices and, accordingly, the data incidentally stored on an unwriteable track is irrelevant. This helps avoid write amplification.

The request processor 320 may map LBAs of the HDD 340 to LBAs of the logical disks at different points in time. For example, the mapping may occur when logical disks are first created and portions of the SMR HDD 340 are first allocated for receiving random write data or sequential write data. A remapping may also occur at a later time in response to portions of the HDD 340 being reallocated (either by a user or automatically based on actual usage thereof). Different portions of a HDD 340 may be allocated for different types of write access. For example, half of a HDD 340 may be allocated for random write access, and the other half of the HDD 340 may be allocated for sequential write access.

Figure 4:
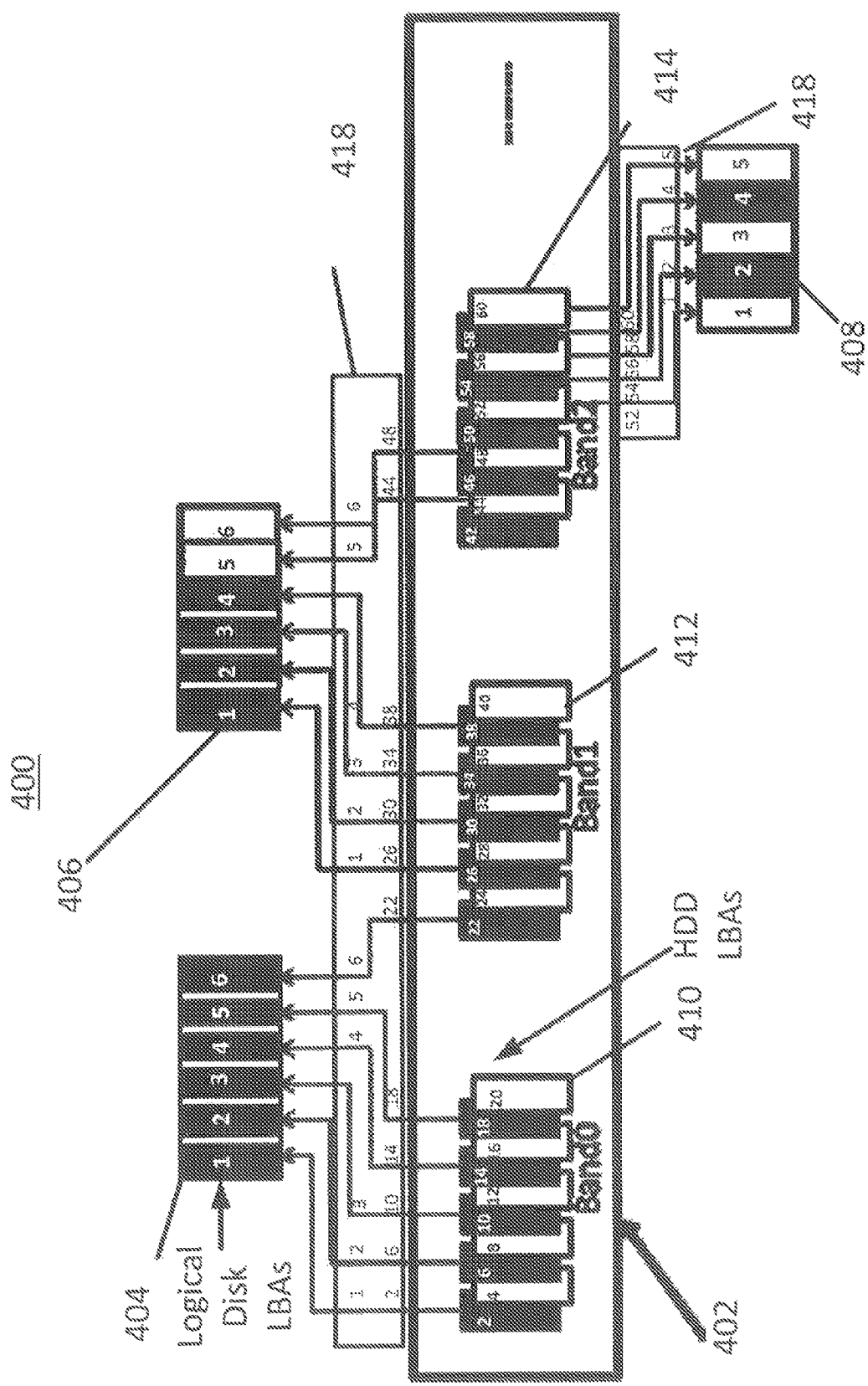
FIG. 4 shows a schematic which is representative of the mapping of physical tracks to logical disks in accordance with an embodiment of the present disclosure.

FIG. 4 shows a schematic 400 which is representative of the mapping of physical tracks 402 of three bands, Band 0 410, Band 1 412, and Band 2 414 in an SMR HDD to three logical disks Logical Disk A 404, Logical Disk B 406, and Logical Disk C 408 in accordance with an embodiment of the present disclosure.

In Band 0 410, every other physical track is mapped to logical disk A 406 by correlating the HDD LBAs 2, 6, 10, 14, and 18 in a mapping layer 418 with the LBAs 1, 2, 3, 4, and 5 of the Logical Disk A 404. The physical tracks of the Band0 0 410 which are mapped are writeable tracks and they can be accessed by external devices. Physical tracks which are not mapped are unwriteable tracks and they cannot be accessed by external devices. Band 0 410, accordingly, shows an embodiment in accordance with the present disclosure where unwriteable tracks are interleaved with writeable tracks. Tracks in Band 0 410 could be written to with random write data without resulting in write amplification.

The first track of Band 1 412 maps to logical disk A 406. Of the remaining tracks, every other physical track in Band 1 412 is mapped to logical disk B 408. These mapped tracks are writeable tracks. The unmapped tracks in Band 1 412 are unwriteable tracks which, accordingly, cannot be accessed by external devices. Similar to Band 0 410, tracks in Band 1 412 could be written to with random write data without resulting in write amplification. Five adjacent tracks in Band 2 414 are mapped to logical disk C 408, making all of these tracks writeable. These tracks would preferably receive sequential write data. These tracks could still receive random write data, but this would result in write amplification.

Referring again to FIGS. 3A and 3B, when logical disks are first created, the request processor 320 obtains information from the SMR HDD 340 such as the capacity of the HDD 340, physical track information, the corresponding LBAs for each physical track, and information about which physical track are within the same band. The request processor 320 creates logical disks based on this information.

In an embodiment of the present disclosure, the request processor 320 creates data structures in a memory from the information, including, for example, a LBA-to-Physical Track map 418, a Logical Disk-to-Physical Track map, and a Writeable Track map.

The LBA-to-Physical Track map identifies the LBAs of the HDD 340 which correspond with the LBAs of the physical tracks in the SMR HDD 340. The map may comprise an identifier for each physical track of the HDD 340, and a corresponding LBA start address and LBA end address for each physical track. This LBA-to-Physical Track map may reflect different values for different models of SMR HDDs. For example, in a first model SMR HDD, physical track 0 may correspond to LBAs 0 to 65536 and physical track 1 may correspond to LBAs 65537 to 131072. In a second model SMR HDD, physical track 0 may correspond to LBAs 0 to 131072. The LBA-to-Physical Track map maintains the different profiles for each model of HDD.

The Logical Disk-to-Physical Track map comprises a logical disk number and the corresponding physical tracks which are logically mapped thereto. Each logical disk may comprise many physical tracks. For example, logical disk 1 may comprise physical tracks 0,1,2,3,4,5,6,7. Logical disk 2 may comprise physical tracks 8,10,12,14,16,18,20,22. The data structure used to retain the Logical Disks-to-Physical Track map may be a linked list, or a function which receives a physical track identifier as in input and returns the corresponding logical disk identifier as on output.

The Writeable Track map maintains a list of all of the physical tracks in the HDD 340 and information indicating which of the physical tracks are logically mapped to a logical disk. For example, physical tracks which are mapped to a logical disk may have a binary "1" flag in the Writeable Track map, and physical tracks which are not mapped to a logical disk may have a binary "0" flag in the Writeable Track map. The Writeable Track map is used for creating logical disks and remapping physical tracks to logical disks in accordance with the present disclosure.

During operation, the request processor 320 intercepts I/O requests intended for the HDD 340, extracts the logical LBA from the IO request, determines the corresponding physical LBAs for the HDD 340, and forwards the IO request to the HDD 340 with the new LBAs. In this way, the request processor 320 indirectly prevents external devices from writing to and reading from certain physical tracks in an HDD 340 by ensuring that the LBAs corresponding to those physical tracks are not reflected in LBAs of the logical disks presented to external devices. In other words, if a particular LBA corresponding to a physical track is not mapped to a logical disk, then the external device would not be aware of, and would not be permitted to access, the corresponding physical track on the HDD.

In an embodiment of the present disclosure, the request processor 320 (or one of its sub-components such as an I/O monitor and analyzer 326) monitors I/O data patterns for physical tracks to determine the tracks to which data is being sequentially written and randomly written. The request processor 320 (or one of its sub-components such as a data reallocation engine 324) may remap physical tracks in the HDD 340 to logical disks as either writeable tracks or unwriteable tracks depending upon the I/O data patterns. In an embodiment, the request processor 320 counts the number of times data is randomly written to physical tracks that are allocated for receiving sequential write data. On a periodic basis, the request processor 320 sorts the tracks according the number of random writes, identifies the tracks with greatest number of random writes, and remaps those tracks for receiving random write data.

The request processor 320 (or one of its sub-components such as the policy engine 322) may override a previous allocation of a portion of a SMR HDD 340 based on the actual use of that portion. For example, a portion may be initially allocated for receiving sequential write data by mapping each physical track in the portion to a logical disk. If the request processor 320 identifies data being written randomly to that portion over a period of time, however, the request processor 320 may remap the physical tracks to logical disks so that unwriteable tracks are interleaved between writeable tracks in the portion in accordance with the present disclosure. In another embodiment, a portion of a HDD may be allocated for random write data by comprising writeable tracks interleaved with unwriteable tracks. If the request processor 320 identifies data being written sequentially to the physical tracks of the portion over a period of time, the request processor 320 may remap the physical tracks to logical disks such that the unwriteable tracks also become mapped to logical disks.

In an embodiment, remapping writeable tracks to unwriteable tracks comprises reading data from the writeable tracks, storing the data to another portion of the SMR HDD 340, and removing the identification of the writable tracks from the logical disks. To perform the reallocation, the logical disks, corresponding with the tracks being remapped, are locked to monitor metadata. IO access to the remapped tracks is also locked. Once the remapping is complete, the locks are disabled. In another embodiment, data on the writeable tracks to be reallocated may be read and stored temporarily in another location on the HDD. Upon the physical tracks being remapped in the logical disk, data is moved from the temporary storage location to newly mapped or designated writeable tracks. This reallocation process can occur in the background so as to minimize the impact on drive performance.

After a period of time, all of the writeable tracks may store data thereon such that no free space remains on the writeable tracks. If that were to occur, the request processor 320 may remap one or more of the unwriteable tracks in the HDD 340 to logical disks so that they become writeable tracks and are accessible by external devices. Although remapping adjacent physical tracks to be writeable tracks may degrade write performance in the HDD 340, it will make available further storage space in the HDD 340. Since an SMR HDD 340 does not, itself, monitor its useable and free space, this is managed by the request processor 320. The request processor 320 uses metadata to track free and occupied space in the Writable Tracks map or other mapping structures.

The Writable Tracks map provides a fast look-up to determine what tracks are writeable and the HDD's remaining free space. The Writeable Tracks map may comprise a binary bit for each physical track of the HDD. If the binary bit is set to a value of "0", then the track is writeable. If the binary bit is set to a value of "1", then the track is unwriteable.

If the request processor 320 is implemented in a RAID controller, as further described below in relation to FIG. 5 and FIG. 6, the RAID controller typically forms a RAID group comprising many disks. A RAID group permits a very large total data storage capacity. It may be more effective to space writeable tracks of an SMR HDD 340 from each other by at least the width of a write header in a system comprising a large data storage capacity such as a RAID group.

Figure 5:
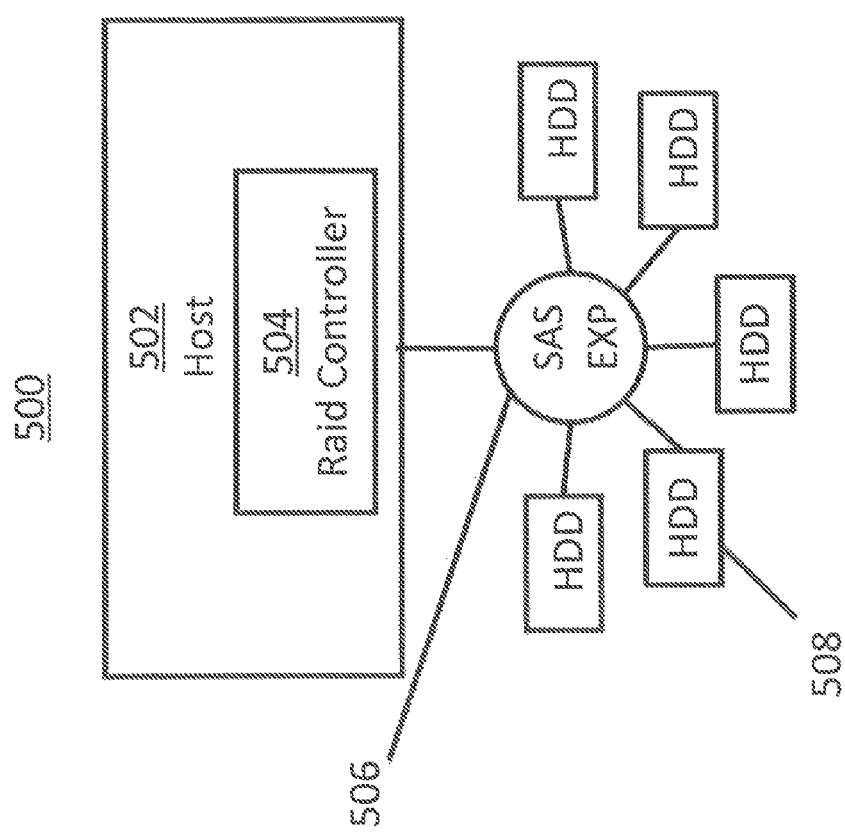
FIG. 5 shows a diagram of a data storage system in accordance with another embodiment of the present disclosure.

FIG. 5 shows a diagram 500 of a host 502, connected through a RAID controller 504 and a Serial attached SCSI (SAS) Expander 506, to multiple SMR HDDs 508 in accordance with an embodiment of the present disclosure. The request processor 320 may be implemented in the SMR HDDs 508, the RAID controller 504, or in the host 502.

Implementing the request processor 320 in the SMR HDD 508 can help reduce unintended complications arising from randomly writing data. For example, implementing the request processor 320 in a SMR HDD 508 helps preserve the logical block order and avoids the need to implement the request processor 320 on a separate device. Other mechanisms may write random I/O data sequentially to tracks on an SMR HDD by continually remapping the LBAs of the logical drive to the LBAs of the physical HDD. This can reduce the sequential read performance, however, when reading that data from the HDD at a later time.

Although the request processor 320 may be implemented in the host 502, the host 502 must maintain the data structures in a memory and must protect the memory against power loss. For example, if the memory is volatile, a battery could be used to power the memory in the event the host 502 lost power.

The request processor 320 may also be implemented in the RAID controller 504 in the host 502. Implementing the request processor 320 in the RAID controller 504 helps reduce the processing overhead of the SMR HDDs 508. When initialized, the RAID controller 504 discovers the HDDs 508 and creates a RAID group therefrom. This protects the data on the HDDs 508 and improves IO performance by stripping data onto multiple HDDs 508. The RAID controller 504 creates logical disks (also referred to as logical volumes) using the capacity from all of the HDDs 508. The RAID controller 504 presents the logical disks to a driver in the host 502 and an OS kernel in the host 502. The RAID Controller 504 records the metadata required by the request processor 320.

Figure 6:
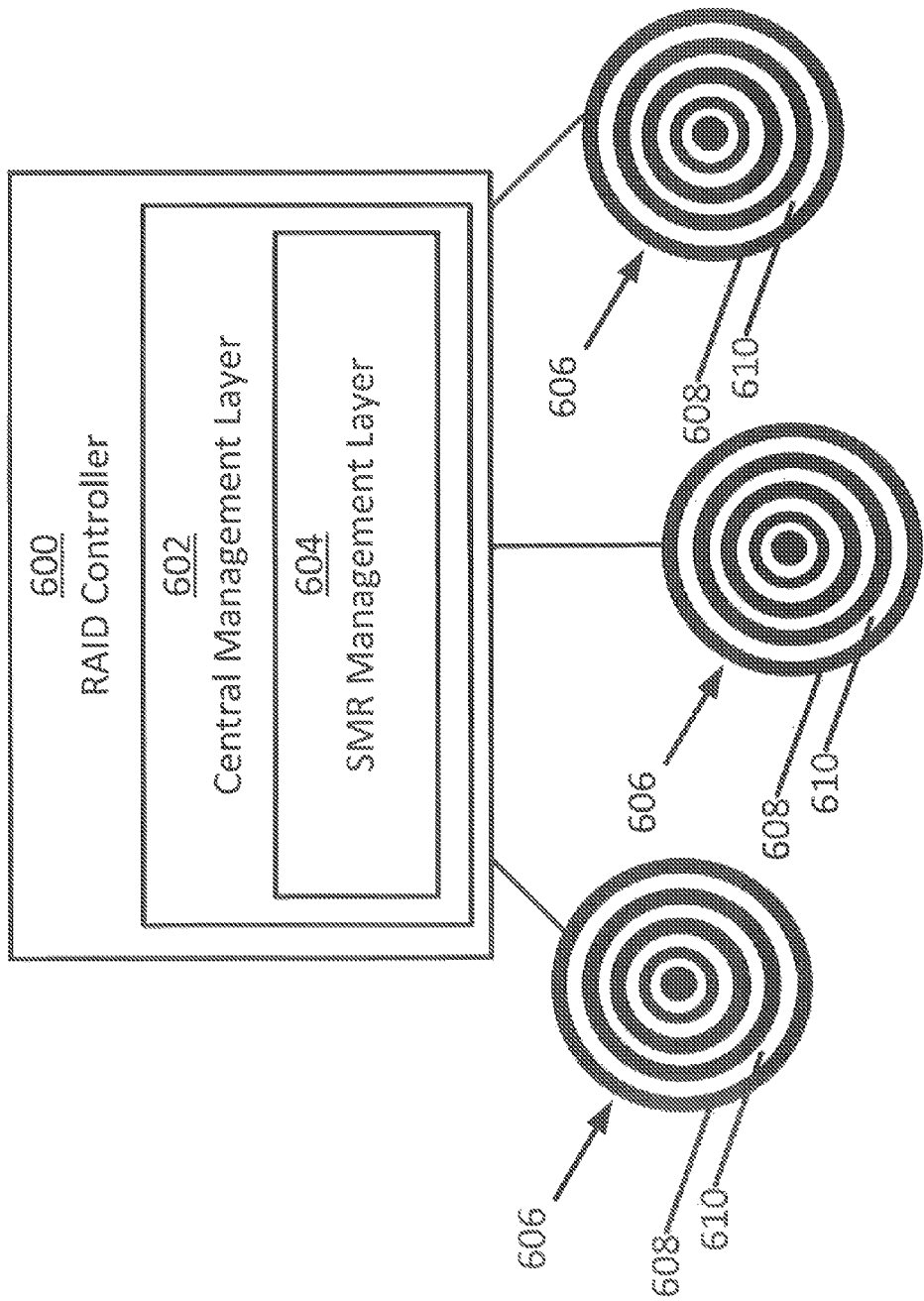
FIG. 6 shows RAID controller firmware 600 containing a program, similar to the VL 302 program of FIG. 3, in accordance with an embodiment of the present disclosure.

FIG. 6 shows a RAID controller 600 containing hardware, software, or a combination thereof with functionality similar to the request processor 320 of FIG. 3 in accordance with an embodiment of the present disclosure. The controller 600 comprises a Central Management Layer 602. The Central Management Layer 602 comprises a SMR Management Layer 604. The Central Management Layer 602 is responsible for RAID functionality such as data protection. The SMR Management Layer 604 may comprise all of the functionality of the request processor 302 including, without limitation, logic and memory to maintain all of the mapping metadata, and reallocating tracks between random data access and sequential data access. The controller 600 is connected to multiple SMR HDDs 606. The SMR HDDs 606 comprise physical tracks which are either writeable tracks 614 or unwriteable tracks 616 based on whether the tracks are mapped to a virtual disk.

In the preceding description, for purposes of explanation, numerous details are set forth in order to provide a thorough understanding of the embodiments of the disclosure. However, it will be apparent to one skilled in the art that these specific details are not required. In other instances, well-known electrical structures and circuits are shown in block diagram form. The above-described embodiments are intended to be examples only. Alterations, modifications, and variations may be effected to the particular embodiments by those of skill in the art without departing from the scope, which is defined solely by the claims appended hereto.

What is claimed is:

1. A data storage system comprising:
   a shingled magnetic recording (SMR) hard drive (HDD) comprising a plurality of SMR tracks, each of the plurality of SMR tracks overlapping with an adjacent track of the plurality of SMR tracks;
   a write header configured to store data to the plurality of SMR tracks, the write header having a write header width;
   a memory storing a logical map mapping writeable tracks of the plurality of SMR tracks to one or more logical disks, the writeable tracks being spaced from each other by a distance greater than the write header width; and
   a controller in communication with the write header and the memory, the controller configured to write data, using the write header, to only the writeable tracks of the plurality of SMR tracks.

2. The data storage system of claim 1, wherein each of the writeable tracks is separated from the other writeable tracks by at least an unwriteable track of the plurality of SMR tracks, the unwriteable track having no mapping in the memory to any logical disk.

3. The data storage system of claim 2, wherein the controller is configured to map the unwriteable tracks in the memory to a logical disk in response to insufficient free space being available on the writeable tracks to store data.

4. The data storage system of claim 2, wherein the controller is configured to map the unwriteable track in the memory to a logical disk in response to the writeable tracks adjacent the unwriteable track receiving sequential write data.

5. The data storage system of claim 1, wherein the controller is a redundant array of independent disks (RAID) controller.

6. The data storage system of claim 1, wherein the controller is a host.

7. The data storage system of claim 1, wherein:
   the SMR HDD further comprises a second plurality of SMR tracks, each of the second plurality of SMR tracks overlapping with another of the second plurality of SMR tracks; and
   the logical map maps writeable tracks of the second plurality of SMR tracks to the one or more logical disks, the writeable tracks comprising all of the tracks of the second plurality of SMR tracks.

8. The data storage system of claim 1, wherein one of the one or more logical disks comprises logical tracks, and the logical map comprises logical tracks mapped to the writeable tracks.

9. A method for creating a logical disk from physical tracks in a shingled magnetic recording (SMR) hard drive (HDD), the SMR HDD comprising a write header having a write header width, the method comprising:
   identifying a plurality of SMR HDD tracks, each of the plurality of the SMR HDD tracks overlapping with an adjacent track of the plurality of SMR HDD tracks; and
   creating a logical disk in a memory by mapping writeable tracks among the plurality of SMR HDD tracks to the logical disk, the writeable tracks being spaced from each other by a distance greater than the write header width.

10. The method of claim 9, further comprising:
    monitoring input/output (IO) requests to the plurality of SMR HDD tracks;
    determining the number of IO requests comprising sequential write data;
    in response to the number of IO requests comprising sequential write data being greater than a threshold number, mapping unwriteable tracks from the plurality of SMR HDD tracks to the logical disk, the unwriteable tracks becoming writeable tracks upon being mapped.

11. A method for remapping a plurality of physical tracks in a shingled magnetic recording (SMR) hard drive (HDD) comprising a write header with a write header width, the method comprising:
    monitoring input/output (IO) requests to the plurality of physical tracks;
    determining the number of IO requests comprising random write data or sequential write data;
    in response to the number of IO requests comprising random write data or sequential write data being greater than a threshold number, remapping the plurality of physical tracks in a memory.

12. The method of claim 11, wherein physical tracks allocated for receiving random write data are remapped for receiving sequential write data in response to the number of IO requests comprising sequential write data being greater than the threshold number.

13. The method of claim 11, wherein physical tracks allocated for receiving sequential write data are reallocated for receiving random write data in response to the number of IO requests comprising random write data being greater than the threshold number.

14. The method of claim 11, wherein remapping the plurality of physical tracks for receiving random write data comprises:
    identifying writeable tracks and unwriteable tracks from the plurality of physical tracks, the writeable tracks being spaced from each other by a distance greater than the write header width, the unwriteable tracks being the plurality of physical tracks other than the writeable tracks;
    transferring data stored on the unwriteable tracks to other physical tracks of the SMR HDD; and
    restricting access to the unwriteable tracks.

15. The method of claim 11, wherein reallocating the plurality of physical tracks for receiving sequential write data comprises permitting access to the plurality of physical tracks.

16. A data storage system comprising:
    a hard drive (HDD) comprising a plurality of physical tracks, each of the plurality of physical tracks adjacent to another of the plurality of physical tracks;
    a read header having a read header width;
    a write header having a write header width greater than the read header width;
    a memory storing information identifying, for external devices, writeable tracks of the plurality of physical tracks, the writeable tracks spaced from each other by a distance greater than the write header width; and a controller in communication with the read header, the write header, and the memory, the controller configured to permit access to only the writeable tracks identified in the memory of the plurality of physical tracks.

17. The data storage system of claim 15, wherein the HDD is a shingled magnetic recording (SMR) HDD.

18. The data storage system of claim 15, wherein each of the writeable tracks is separated from the other writeable tracks by at least an unwriteable track of the plurality of physical tracks of the HDD, the memory having no information identifying, for external devices, the unwriteable tracks of the plurality of physical tracks.

19. The data storage system of claim 15, wherein the information identifies a logical disk, the logical disk identifying the writeable tracks of the plurality of physical tracks.

20. The data storage system of claim 15, wherein the controller comprises a request processor.

* * * * *